ically and is characterized by the fact that the bromine is used in a closed circuit.

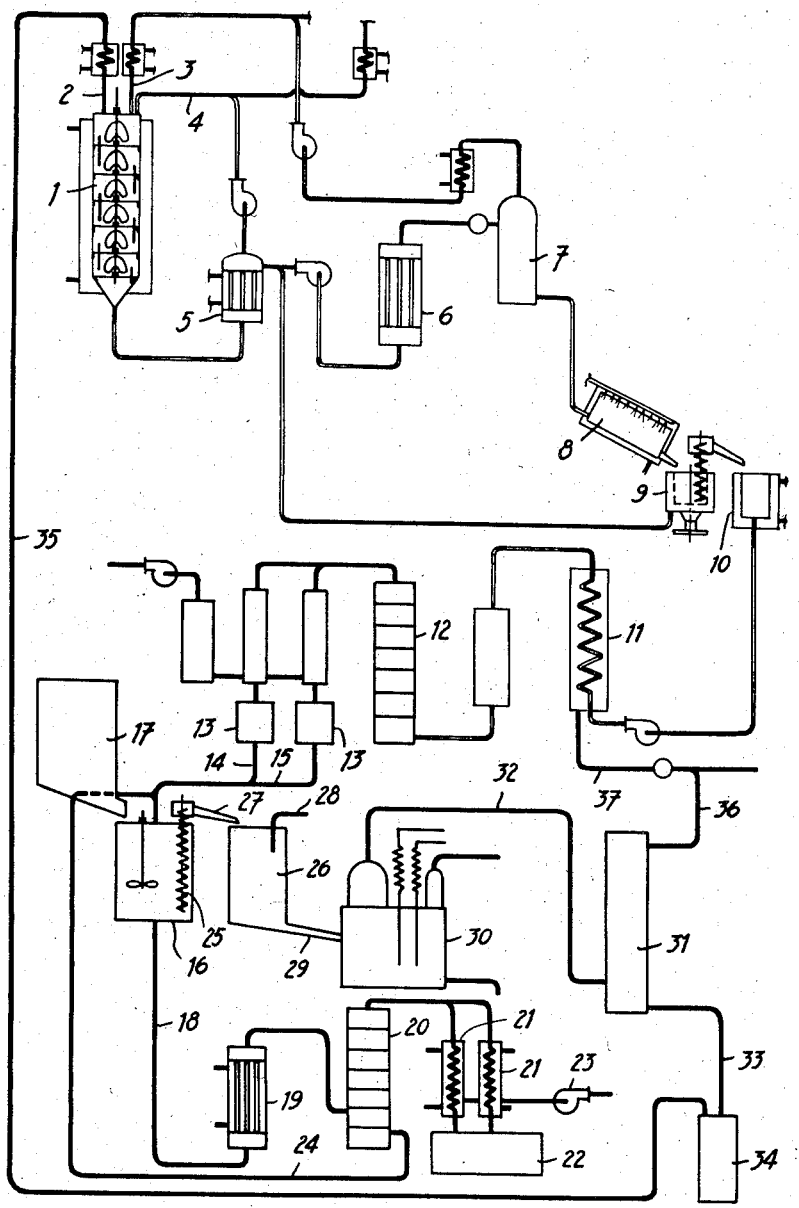

United States Patent Office 2,880,228
Patented Mar. 31, 1959

2,880,228
PROCESS FOR THE PREPARATION OF ADIPONITRILE

John Elian, Uccle-Brussels, and Marcel Lepingle, Schaerbeek-Brussels, Belgium, assignors to Cellulose-Polymeres et Derives "Cepede," S.A., Brussels, Belgium, and Red-Gesellschaft m.b.H., Technik und Produkte: Cellulose, Chemie und Chemie der Kunststoffe, Hamburg, Germany Application March 20, 1957, Serial No. 647,374

Claims priority, application France March 4, 1957

2 Claims. (Cl. 260—465.8)

A known method for preparing adiponitrile consists in converting dichlorobutane to adipodinitrile by the action of sodium or potassium cyamide.

It is also known that bromine compounds react more vigorously than chlorine compounds. Despite this fact, chlorine compounds have generally been preferred to bromine compounds because of their lower cost.

The process, subject of the invention, provides a way for using bromine compounds economically and is characterized by the fact that the bromine is used in a closed circuit.

This new process, therefore, does not need a continuous addition of bromine, the original amount involved being continuously regenerated and circulating in a closed cycle.

The process according to the invention is thus characterized by the following steps: butadiene is converted to dibromobutene, the latter is converted to dibromobutane, and finally this dibromobutane is converted to adiponitrile.

The conversion of butadiene to dibromobutene and subsequently to dibromobutane can be carried-out in any suitable way but preferably by applying the process described in the U.S. patent application Serial No. 647,375, filed on March 20, 1957, on behalf of the same claimants.

The dibromobutane is then made to react with an alkaline cyanide. The amounts of dibromobutane and of cyanide which are made to react are chosen in such proportions that there is a slight excess of bromide compound. By following this procedure, the whole of the cyanide is converted to sodium or potassium bromide.

Adiponitrile is formed and is rectified by distillation under reduced pressure.

The alkaline bromide which is being collected is introduced into an electrolytic cell in which its aqueous solution is split into bromine and a solution of sodium or potassium hydroxide. The bromine is reintroduced in that part of the apparatus in which the preparation of dibromobutene takes place; it thus circulates in a closed circuit.

It is a well known fact that in electrolytic cell hydrogen is formed together with the halogene and the alkaline solution, according to the following reaction $$2NaBr + 2H_2O \rightarrow Br_2 + 2NaOH + H_2$$

The resulting hydrogen is used for the hydrogenation operation which constitutes an integral part of the process described in the U.S. patent application Serial No. 647,375, filed on March 20, 1957, whereby the reaction takes place according to the following equation:

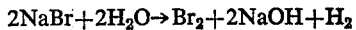

The various steps of such continuous process are described in detail hereafter with reference to the appended diagram.

In this example of a practical application, the first two steps of the process, i.e. the conversion of butadiene to dibromobutene and subsequently of the latter to dibromobutane are performed in the equipment described in aforementioned U.S. patent application Serial No. 647,375, filed March 20, 1957, on behalf of the claimants.

In the appended diagram, this apparatus is represented by the reaction column 1, the tubes 2, 3, 4 for introducing into the latter the bromine, the butadiene and the solvent respectively, the heat exchangers 5—6, the separator 7, the cooling drum 8, the centrifuge 9, the heated container 10 and the hydrogenation apparatus 11.

As described in the U.S. patent application Serial No. 647,375, filed on March 20, 1957, it is in this apparatus that the butadiene is converted to dibromobutene and then to dibromobutane. The latter is then rectified in the known manner in column 12 and collected in containers 13. The most characteristic step of the process according to the present invention begins at these containers 13 and takes the following course. The dibromobutane contained therein flows through tubes 14—15 into a mixer 16 where it is mixed with cyanide contained in the hopper 17. The adiponitrile which is formed flows-off via tube 18 into the pre-heater 19 and thence into the distillation column 20. The adiponitrile is then condensed in the condensers 21 and collected in the reservoir 22. A vacuum pump 23 is connected to aforesaid condenser 21. The excess of dibromobutane which has accumulated in the distillation column 20 returns to the mixer 16 via tube 24. The alkaline bromide is removed from the trough of mixer 16 by any suitable lifting device 25 and led into hopper 26 along a spout 27. This hopper 26 carries a tube 28 for admitting warm water in order to dissolve the alkaline bromide. The resulting solution flows through tube 29 into the electrolytic cell 30. The bromine and the hydrogen are separated in column 31 into which they have been brought via tube 32. The bromine is removed by tube 33 and collected in a container 34 whence it is returned via tube 35 to the reaction column 1 which serves in the first step of the process.

The hydrogen which has been separated in column 31 is transferred by tubes 36—37 to the aforementioned hydrogenation apparatus 11.

Thus a continuous process has been arrived at in which the bromine is being constantly recycled and the hydrogen recuperated.

What we claim is:

1. A continuous process for the preparation of adiponitrile from butadiene comprising brominating said butadiene to form an equilibrium mixture containing 1,4 dibromobutene and 1,2 dibromobutene, continuously reintroducing separated 1,2 dibromobutene into said equilibrium mixture of 1,4 dibromobutene and 1,2 dibromobutene, heating at 90–95° C. to convert 1,2 dibromobutene so introduced to 1,4 dibromobutene, separating said 1,4 dibromobutene from said 1,2 dibromobutene by distillation, hydrogenating said separated portion of 1,4 dibromobutene to form 1,4 dibromobutane, reacting said dibromobutane with an alkali metal cyanide to form adiponitrile and an alkali metal bromide, recovering said alkali metal bromide, regenerating bromine from recovered alkali metal bromide in an electrolytic cell which forms by-product hydrogen, separating said by-product hydrogen, reintroducing said bromine for brominating said butadiene to form dibromobutene and reintroducing the separated hydrogen for converting dibromobutene to dibromobutane.

2. A process as described in claim 1 wherein a molar excess of dibromobutane is reacted with alkali metal cyanide and wherein hydrogen and bromine from said electrolytic cell are circulated in a closed system from which sodium hydroxide solution resulting from electrolysis is evacuated.

References Cited in the file of this patent

UNITED STATES PATENTS

| | | |
|---|---|---|
| 1,406,624 | Dow | Feb. 14, 1922 |
| 2,038,593 | Muskat | Apr. 28, 1936 |
| 2,299,477 | Hearne et al. | Oct. 20, 1942 |
| 2,415,261 | Rodgers | Feb. 4, 1947 |
| 2,448,755 | Zellner | Sept. 7, 1948 |
| 2,477,674 | Whitman | Aug. 2, 1949 |
| 2,483,049 | Hillyer et al. | Sept. 27, 1949 |
| 2,484,042 | Mahler | Oct. 11, 1949 |
| 2,532,311 | Howk et al. | Dec. 5, 1950 |
| 2,658,929 | Ladd et al. | Nov. 10, 1953 |
| 2,715,138 | Crane | Aug. 9, 1955 |

FOREIGN PATENTS

| | | |
|---|---|---|
| 646,966 | Great Britain | Feb. 11, 1948 |